Dec. 31, 1935.                A. E. BECKER                2,026,452
FISHHOOK
Filed Oct. 11, 1933
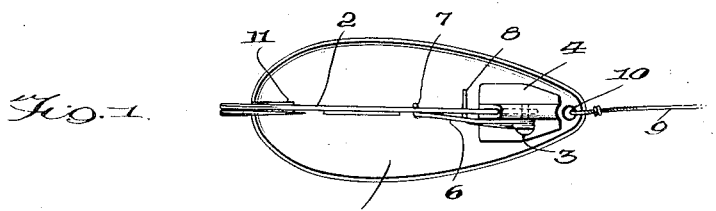
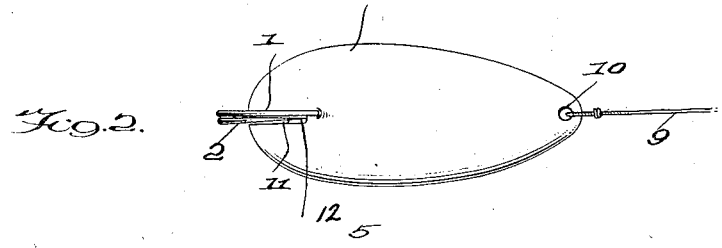
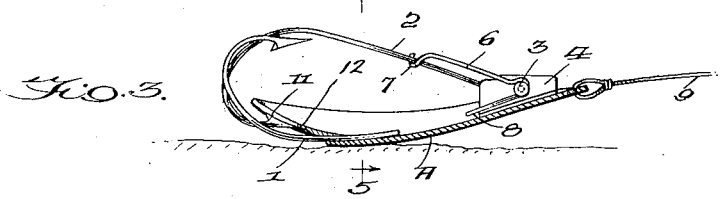
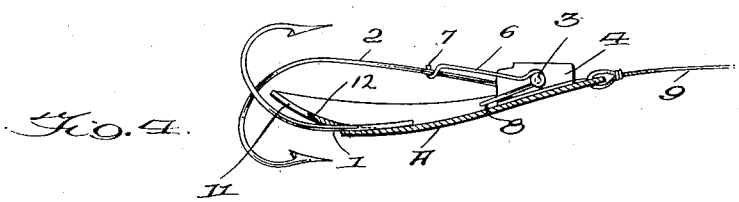
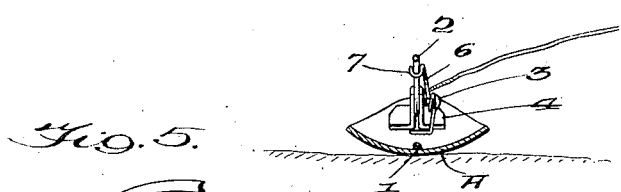
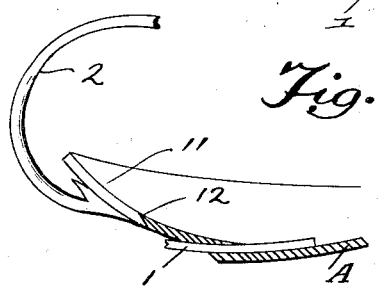
Inventor
Albert E. Becker
By Vernon E. Hodges
Attorney Patented Dec. 31, 1935

2,026,452

UNITED STATES PATENT OFFICE 2,026,452

FISHHOOK

Albert E. Becker, Stewartville, Minn.

Application October 11, 1933, Serial No. 693,184

3 Claims. (Cl. 43—39)

My invention relates to an improvement in fish-hooks.

One of the most trying experiences an angler suffers is catching weeds and snags. All sorts of hooks have been devised to prevent this, and most of them have been failures.

The object of my present invention is to provide what I term a weedless hook, and by that I mean one which is practically immune from catching weeds, the desideratum being that it shall be completely weedless.

The invention consists of a spoon and two hooks, one rigidly secured to the spoon and projecting over one end of it, and the other pivoted and spring-actuated, and normally the barbs of both hooks are within the area of the back of the hook and guarded thereby, so that there is little or no liability of the hook catching anything but the fish, and that is due to the fish taking the hook and bait in its mouth, and compressing the pivoted hook so that the two barbs are released and projected in opposite directions from the spoon.

In the accompanying drawing:

Fig. 1 is a view looking into the spoon from the top;

Fig. 2 is a reverse view;

Fig. 3 is a longitudinal sectional view showing the hook in its normal condition;

Fig. 4 is a longitudinal sectional view with the pivoted hook pressed inwardly against the action of the spring, whereby the hooks are spread and unguarded and in the position taken when catching a fish;

Fig. 5 is a transverse section on the line 5—5 on Fig. 3, looking in the direction of the arrows;

Fig. 6 is an enlarged fragmentary detail showing the hooks in the position shown in Fig. 3.

The spoon A is concavo-convex and elongated in shape, very much like any other spoon or spoon hook. One hook, which will be termed the rigid hook, is designated by the numeral 1, and is offset to the spoon as shown in Figs. 3, 4 and 5. This hook extends outwardly from the rear end of the spoon, thence upwardly and forwardly, as illustrated in Figs. 3 and 4.

The second hook, which will be designated the pivoted hook, bears the numeral 2, and this hook is pivotally secured with the forward end of the spoon by the pin 3 passing through the bracket 4, which latter is raised or otherwise secured inside the forward end of the spoon as shown in Fig. 5.

The pivoted end of the hook 2 extends between the two sides of this bracket as viewed in Fig. 5, so that it is held against lateral movement, but allowed to spring up and down, or in and out as the case may be, as clearly illustrated in Figs. 3 and 4. A spring 6 is preferably bent around the pin 3, and has a hook 7 at one end bent around the pivoted hook. The other end 8 is bent laterally as shown in Fig. 1 and rests against the bottom of the spoon. This spring is replaceable, as it is the only part of the fish-hook likely to get out of order, by either removing the pin 3 or unwinding it therefrom.

The fish-line 9 is attached to the hole 10 formed in the forward end of the spoon. It will be noticed that the pivoted hook 2 is held upwardly or outwardly, as shown in Fig. 3 by the expansive action of the spring, and this is the normal position of the parts. It will be seen that when so held the shank of the hook 2 forms a guard about the point and barb of the hook 1, and the shank of the hook 1 in like manner forms a guard about the point and barb of the hook 2, thus guarding and protecting the barbs and preventing them from catching weeds and snags, and insuring against the barbs being exposed beyond the area of the shanks of the hooks, except when inward pressure is exerted on the pivoted hook by the fish in taking the bait in its mouth.

The notch 11 in the outer end of the spoon further holds the pivoted hook against lateral displacement when the pivoted hook has reached its extreme open position. The recess 12 is provided in the spoon A to receive the point of the hook 2 when the hook is in its normal closed position. If bait is used, it is secured on hook 1.

This hook will not engage weeds, it is flexible, and both the pivoted hook and spring are easily replaceable. The hooks automatically set if and when the fish strikes.

The spoon may be made of various kinds of metal, and in any size desired in accordance with the size of the game for which the fisherman is angling.

I claim:

1. A fish-hook comprising a spoon, two hooks, one rigidly secured to the spoon, the other pivoted thereto, a bracket between the sides of which the pivoted hook is held for guiding the said hook vertically as it swings in and out, and a notch and recess in the spoon said notch being adapted to hold the pivoted hook against lateral displacement when said hooks are in a contracted position, and said recess being adapted to hold the point of said pivoted hook when said hooks are in an expanded position.

2. A fish-hook of the class described including a spoon, a stationary hook attached thereto near one end thereof, a hook pivoted thereto near the opposite end thereof, a spring for normally holding said pivoted hook in registry with said stationary hook, said spoon having a notch and a recess, said recess being adapted to receive the point of said pivoted hook while the said hooks are in registry and said notch being adapted to receive the shank of said pivoted hook while the hooks are in an open position.

3. In a spoon-hook including a hook secured to the inside of said spoon and extending through the spoon near one end thereof, another hook pivoted to said spoon near the other end of said spoon, and a notch in said spoon at the end remote from the pivot point of said pivoted hook, said notch adapted to receive the shank of the pivoted hook and prevent lateral movement of said hook.

ALBERT E. BECKER.